United States Patent
Yu

(10) Patent No.: US 9,804,832 B2
(45) Date of Patent: Oct. 31, 2017

(54) METHOD, APPARATUS, AND COMMUNICATION DEVICE FOR UPDATING FIRMWARE

(71) Applicant: Huawei Device Co., Ltd., Shenzhen (CN)

(72) Inventor: Jingjing Yu, Shenzhen (CN)

(73) Assignee: HUAWEI DEVICE CO., LTD, Shenzhen ( * ) Notice: Subject to any disclaimer, the term of this patent is extended or adjusted under 35 U.S.C. 154(b) by 0 days.

(21) Appl. No.: 14/896,492

(22) PCT Filed: Jun. 9, 2014

(86) PCT No.: PCT/CN2014/079440
§ 371 (c)(1),
(2) Date: Dec. 7, 2015

(87) PCT Pub. No.: WO2014/194865
PCT Pub. Date: Dec. 11, 2014

(65) Prior Publication Data
US 2016/0132315 A1 May 12, 2016

(30) Foreign Application Priority Data
Jun. 8, 2013 (CN) .......................... 2013 1 0228240

(51) Int. Cl.
*G06F 9/44* (2006.01)
*G06F 9/445* (2006.01)
(Continued)

(52) U.S. Cl.
CPC .................. *G06F 8/65* (2013.01); *G06F 8/61* (2013.01); *G06F 15/167* (2013.01); *H04L 67/06* (2013.01); *H04L 67/34* (2013.01)

(58) Field of Classification Search
CPC ..................................... G06F 8/65; G06F 8/61
(Continued)

(56) References Cited

U.S. PATENT DOCUMENTS

2003/0066062 A1* 4/2003 Brannock ............... G06F 8/665
717/169
2003/0088868 A1* 5/2003 Chang ...................... G06F 8/65
717/173
(Continued)

FOREIGN PATENT DOCUMENTS

| CN | 1991761 A | 7/2007 |
| CN | 101344854 A | 1/2009 |

(Continued)

OTHER PUBLICATIONS

Partial English Translation and Abstract of Chinese Patent Application No. CN101447035, Dec. 9, 2015, 7 pages.
(Continued)

*Primary Examiner* — Phillip H Nguyen
(74) *Attorney, Agent, or Firm* — Conley Rose, P.C.

(57) ABSTRACT

A method, an apparatus, a device, and a mobile terminal for updating firmware. The method for updating firmware includes obtaining an update start command; after the update start command is obtained, reading a firmware update file from a secure data memory; and writing the firmware update file to a Flash memory. When a Secure Digital (SD) interface does not support a Secure Digital Input and Output (SDIO) function, a mobile terminal and a communication device having an SD interface can only read data in the secure data memory in units of files. In this application, special files are defined in the secure data memory to store an update start command and update data in different files. Therefore, the communication device having the SD interface can obtain the update start command from a command swap file, and (Continued)

obtain a firmware update file in a firmware update process to perform an update.

20 Claims, 9 Drawing Sheets

(51) Int. Cl.
  *G06F 15/167* (2006.01)
  *H04L 29/08* (2006.01)
(58) Field of Classification Search
  USPC .......................................... 717/168, 173, 178
  See application file for complete search history.

(56) References Cited

U.S. PATENT DOCUMENTS

| | | | |
|---|---|---|---|
| 2004/0199911 | A1 | 10/2004 | Lo et al. |
| 2004/0225875 | A1 | 11/2004 | Huang et al. |
| 2006/0282653 | A1 | 12/2006 | Chu et al. |
| 2007/0038801 | A1* | 2/2007 | Tanaka ............... G06F 11/1433 711/103 |
| 2007/0234332 | A1* | 10/2007 | Brundridge ............... G06F 8/65 717/168 |
| 2007/0234341 | A1* | 10/2007 | Chang ...................... G06F 8/65 717/173 |
| 2008/0301665 | A1* | 12/2008 | Charlton ............... G06Q 50/22 717/170 |
| 2010/0199078 | A1 | 8/2010 | Shih et al. |
| 2010/0325622 | A1* | 12/2010 | Morton .................... G06F 8/68 717/168 |
| 2011/0191499 | A1* | 8/2011 | Andersson ............... G06F 3/00 710/5 |
| 2013/0097655 | A1* | 4/2013 | Vaidyanathan ......... G06F 21/57 726/1 |
| 2013/0179870 | A1* | 7/2013 | Kelso ....................... G06F 8/65 717/169 |
| 2013/0179871 | A1* | 7/2013 | Nagao ...................... G06F 8/65 717/170 |
| 2013/0185563 | A1* | 7/2013 | Djabarov ................. G06F 9/44 713/176 |

FOREIGN PATENT DOCUMENTS

| | | |
|---|---|---|
| CN | 101447035 A | 6/2009 |
| CN | 101799881 A | 8/2010 |
| CN | 201781586 U | 3/2011 |
| CN | 102004657 A | 4/2011 |
| CN | 103309709 A | 9/2013 |
| JP | 2005508547 A | 3/2005 |

OTHER PUBLICATIONS

Partial English Translation and Abstract of Chinese Patent Application No. CN102004657, Dec. 9, 2015, 4 pages.
Partial English Translation and Abstract of Chinese Patent Application No. CN103309709, Dec. 8, 2015, 3 pages.
Partial English Translation and Abstract of Chinese Patent Application No. CN101344854, Mar. 14, 2016, 3 pages.
Partial English Translation and Abstract of Chinese Patent Application No. CN201781586, Mar. 14, 2016, 3 pages.
Partial English Translation and Abstract of Chinese Patent Application No. CN101799881, Mar. 14, 2016, 3 pages.
Partial English Translation and Abstract of Japanese Patent Application No. JPA2005508547, Mar. 24, 2016, 58 pages.
Foreign Communication From a Counterpart Application, Chinese Application No. 201310228240.2, Chinese Office Action dated Sep. 25, 2015, 10 pages.
Foreign Communication From a Counterpart Application, Japanese Application No. 2014-115531, Japanese Office Action dated Jun. 9, 2015, 2 pages.
Foreign Communication From a Counterpart Application, Japanese Application No. 2014-115531, English Translation of Japanese Office Action dated Jun. 9, 2015, 2 pages.
Foreign Communication From a Counterpart Application, PCT Application No. PCT/CN2014/079440, English Translation of International Search Report dated Sep. 9, 2014, 3 pages.
Foreign Communication From a Counterpart Application, PCT Application No. PCT/CN2014/079440, English Translation of Written Opinion dated Sep. 9, 2014, 13 pages.

* cited by examiner

METHOD, APPARATUS, AND COMMUNICATION DEVICE FOR UPDATING FIRMWARE

CROSS-REFERENCE TO RELATED APPLICATIONS

This application is a National Stage of International Application No. PCT/CN2014/079440, filed on Jun. 9, 2014, which claims priority to Chinese Patent Application No. 201310228240.2, filed on Jun. 8, 2013, both of which are hereby incorporated by reference in their entireties.

TECHNICAL FIELD

This application relates to the field of device update technologies, and in particular, to a method, an apparatus, and a communication device for updating firmware.

BACKGROUND

Nowadays, many mobile terminals have a Secure Digital (SD) interface, so that the mobile terminals can support an SD card. Because the SD card has features of a small size, large capacity, and plug-and-play, the SD card is generally used as an external storage device of a mobile terminal for storing data. Furthermore, the mobile terminal may use the SD card to update firmware.

The process of using the SD card to update firmware by the mobile terminal may be as follows. After a firmware update file is copied to the SD card, the SD card is inserted into an SD interface, so that the SD card is connected to the mobile terminal. The mobile terminal reads the firmware update file in the SD card to update software of the mobile terminal.

The mobile terminal may further insert a communication device having an SD interface into the SD interface. The communication device having the SD interface may support access to a Second Generation (2G), Third Generation (3G), or wireless network. Therefore, the mobile terminal can perform wireless Internet access through the communication device having the SD interface.

When the SD interface supports a Secure Digital Input and Output (SDIO) function, the communication device having the SD interface can write a firmware update file in the mobile terminal to an SD memory of the mobile terminal. After reading an update start command in the mobile terminal, the communication device having the SD interface runs the firmware update file in the SD memory to complete a firmware update.

However, some SD interfaces do not support the SDIO function. A communication device having such an SD interface cannot know, through the SD interface, whether data read by the communication device from the mobile terminal is an update start command, and further, the communication device having the SD interface cannot start a firmware update.

SUMMARY

The present disclosure provides a method for updating firmware, so as to solve the problem in the prior art that when an SD interface does not support an SDIO function, a communication device having an SD interface cannot start a firmware update after the communication device is inserted into the SD interface.

This application further provides an apparatus for updating firmware and a communication device, so as to ensure that the method can be implemented and applied practically.

According to a first aspect, this application provides a method for updating firmware, applied to a communication device having a secure data interface through which the communication device having the secure data interface performs data communication with a mobile terminal, where the communication device having the secure data interface includes a secure data memory and a Flash memory, and the secure data memory stores a command swap file, where the secure data memory is a memory accessed by the mobile terminal through the secure data interface, the Flash memory is a memory storing the firmware in the communication device having the secure data interface, the method including obtaining an update start command from the command swap file, where the update start command is written by the mobile terminal to the command swap file; after the update start command is obtained, reading, from the secure data memory, a firmware update file storing update data, where the firmware update file is downloaded by the mobile terminal and written by the mobile terminal to the secure data memory, and the update data includes program codes for updating the firmware of the communication device having the secure data interface; and writing the firmware update file to the Flash memory.

In a first possible implementation of the first aspect, the secure data memory further stores a result swap file, and the method further includes, in the process of writing the firmware update file to the Flash memory, writing update progress to the result swap file; and after the firmware update file is written to the Flash memory, writing the update result to the result swap file.

With reference to the first possible implementation manner of the first aspect, in a second possible implementation manner of the first aspect, the update progress and update result are written to the result swap file by using a small computer system interface command.

With reference to the first possible implementation manner of the first aspect, in a third possible implementation manner of the first aspect, the method further includes obtaining an update status query command from the command swap file; and after the update status query command is obtained, sending the result swap file to the mobile terminal, where the update progress and update result are written in the result swap file.

In a fourth possible implementation of the first aspect, the method further includes, after the firmware update file is written to the Flash memory completely, deleting the update start command from the command update file.

With reference to any possible implementation manner of the first possible implementation manner to the fourth possible implementation manner of the first aspect, in a fifth possible implementation manner of the first aspect, the method further includes, after the update start command is obtained, restarting the communication device having the secure data interface, entering an update mode of the communication device having the secure data interface, and in the update mode, reading, from the secure data memory, the firmware update file storing the update data; and after the firmware update file is written to the Flash memory completely, restarting the communication device having the secure data interface, and entering a common running mode of the communication device having the secure data interface.

With reference to any possible implementation manner of the first possible implementation manner to the fourth possible implementation manner of the first aspect, in a sixth possible implementation manner of the first aspect, before the firmware update file storing the update data is read from the secure data memory, the method further includes checking the firmware update file; and after it is checked that the firmware update file is a valid file, reading, from the secure data memory, the firmware update file storing the update data.

According to a second aspect, this application provides a method for updating firmware, applied to a mobile terminal which performs data communication through a secure digital interface with a communication device having a secure data interface, where the communication device having the secure data interface includes a secure data memory and a Flash memory, and the secure data memory stores a command swap file, where the secure data memory is a memory accessed by the mobile terminal through the secure data interface, the Flash memory is a memory storing the firmware in the communication device having the secure data interface, the method including downloading a firmware update file storing update data; writing the firmware update file to the secure data memory; and after the firmware update file is written to the secure data memory completely, writing an update start command in the mobile terminal to the command swap file, so that the communication device having the secure data interface obtains the update start command to perform firmware update.

In a first possible implementation manner of the second aspect, the method further includes writing an update status query command in the mobile terminal to the command swap file.

With reference to the first possible implementation manner of the second aspect, in a second possible implementation manner of the second aspect, the secure data memory further stores a result swap file, and the method further includes receiving the result swap file sent by the communication device having the secure data interface, where the result swap file is sent after the communication device having the secure data interface obtains the update status query command, and the update progress and update result are written in the result swap file; and displaying the update progress and update result on the mobile terminal.

With reference to the first possible implementation manner of the second aspect, in a third possible implementation manner of the second aspect, the update start command and update status query command are written to the command swap file by using a small computer system interface command.

According to a third aspect, this application further provides an apparatus for updating firmware, applied to a communication device having a secure data interface through which the communication device having the secure data interface performs data communication with a mobile terminal, where the communication device having the secure data interface includes a secure data memory and a Flash memory, and the secure data memory stores a command swap file, where the secure data memory is a memory accessed by the mobile terminal through the secure data interface, the Flash memory is a memory storing the firmware in the communication device having the secure data interface, the apparatus including a first obtaining unit configured to obtain an update start command from the command swap file, where the update start command is written by the mobile terminal to the command swap file; a reading unit configured to, after the update start command is obtained, read, from the secure data memory, a firmware update file storing update data, where the firmware update file is downloaded by the mobile terminal and written by the mobile terminal to the secure data memory, and the update data includes program codes for updating the firmware of the communication device having the secure data interface; and a first writing unit configured to write the firmware update file to the Flash memory.

In a first possible implementation of the third aspect, the secure data memory further stores a result swap file, and the apparatus further includes a second writing unit configured to write update progress to the result swap file in the process of writing the firmware update file to the Flash memory; and a third writing unit configured to write the update result to the result swap file after the firmware update file is written to the Flash memory.

With reference to the first possible implementation manner of the third aspect, in a second possible implementation manner of the third aspect, the second writing unit writes the update progress to the result swap file by using a small computer system interface command; and the third writing unit writes the update result to the result swap file by using a small computer system interface command.

With reference to the first possible implementation manner of the third aspect, in a third possible implementation manner of the third aspect, the apparatus further includes a second obtaining unit configured to obtain an update status query command from the command swap file; and a sending unit configured to send the result swap file to the mobile terminal after the update status query command is obtained, where the update progress and update result are written in the result swap file.

In a fourth possible implementation of the third aspect, the apparatus further includes a deleting unit configured to delete the update start command from the command update file after the firmware update file is written to the Flash memory completely.

With reference to any possible implementation manner of the first possible implementation to the fourth possible implementation of the third aspect, in a fifth possible implementation manner of the third aspect, the apparatus further includes a starting unit configured to, after the update start command is obtained, restart the communication device having the secure data interface, and enter an update mode of the communication device having the secure data interface, and after the firmware update file is written to the Flash memory completely, restart the communication device having the secure data interface, and enter a common running mode of the communication device having the secure data interface; and the reading unit is configured to read, in the update mode from the secure data memory, the firmware update file storing the update data.

With reference to any possible implementation manner of the first possible implementation manner to the fourth possible implementation manner of the third aspect, in a sixth possible implementation manner of the third aspect, the apparatus further includes a checking unit configured to check the firmware update file; where the reading unit is configured to, after it is checked that the firmware update file is a valid file, read, from the secure data memory, the firmware update file storing the update data.

According to a fourth aspect, this application further provides a communication device having a secure data interface, where the communication device having the secure data interface includes a secure data memory, a Flash memory, and the apparatus for updating firmware according to the third aspect of this application, where the apparatus for updating firmware performs data communication with the secure data memory and the Flash memory respectively, and the secure data memory stores a command swap file, where the secure data memory is a memory accessed by the mobile terminal through the secure data interface, and the Flash memory is a memory storing the firmware in the communication device having the secure data interface.

According to a fifth aspect, this application provides an apparatus for updating firmware, applied to a mobile terminal which performs data communication through a secure digital interface with a communication device having a secure data interface, where the communication device having the secure data interface includes a secure data memory and a Flash memory, and the secure data memory stores a command swap file, where the secure data memory is a memory accessed by the mobile terminal through the secure data interface, the Flash memory is a memory storing the firmware in the communication device having the secure data interface, the apparatus including a downloading unit configured to download a firmware update file storing update data; a fourth writing unit configured to write the firmware update file to the secure data memory; and a fifth writing unit configured to write an update start command in the mobile terminal to the command swap file after the firmware update file is written to the secure data memory completely, so that the communication device having the secure data interface obtains the update start command to perform firmware update.

In a first possible implementation manner of the fifth aspect, the apparatus further includes a sixth writing unit configured to write an update status query command in the mobile terminal to the command swap file.

With reference to the first possible implementation manner of the fifth aspect, in a second possible implementation manner of the fifth aspect, the secure data memory further stores a result swap file, and the apparatus further includes a receiving unit configured to receive the result swap file sent by the communication device having the secure data interface, where the result swap file is sent after the communication device having the secure data interface obtains the update status query command, and the update progress and update result are written in the result swap file; and a displaying unit configured to display the update progress and update result on the mobile terminal.

With reference to the first possible implementation manner of the fifth aspect, in a third possible implementation manner of the fifth aspect, the fifth writing unit writes the update start command to the command swap file by using a small computer system interface command; and the sixth writing unit writes the update status query command to the command swap file by using a small computer system interface command.

Compared with the prior art, this application has the following advantages.

When an SD interface does not support an SDIO function, a mobile terminal and a communication device having an SD interface can only read and write data in a secure data memory in units of files. In this application, special files may be defined in the secure data memory to store an update start command and update data in different files, so that the mobile terminal and the communication device having the SD interface can know, by identifying the file names, whether data stored in the files is an update start command or update data.

In this application, the secure data memory stores two special files: a command swap file and a firmware update file. In the two special files, the command swap file stores an update start command written by the mobile terminal, and the firmware update file stores update data. The communication device having the SD interface may obtain, by identifying the file names, data required in a firmware update process from the corresponding files.

When the communication device having the SD interface obtains the update start command from the command swap file, it indicates that the communication device having the SD interface starts to perform firmware update. Therefore, the communication device having the SD interface further reads, from the secure data memory, the firmware update file storing the update data, and then writes the firmware update file to the Flash memory to complete the firmware update.

BRIEF DESCRIPTION OF DRAWINGS

To describe the technical solutions in the embodiments of the present application more clearly, the following briefly introduces the accompanying drawings required for describing the embodiments. The accompanying drawings in the following description show merely some embodiments of the present application, and a person of ordinary skill in the art may still derive other drawings from these accompanying drawings without creative efforts.

DESCRIPTION OF EMBODIMENTS

Figure 1:
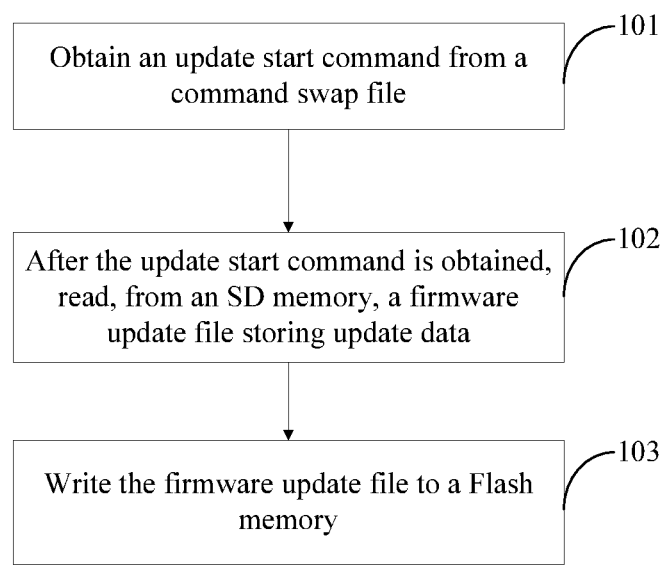
FIG. 1 is a flowchart of a method for updating firmware according to this application.

This application may be applied to environments or configurations of many universal or dedicated computing apparatuses, for example, a personal computer, a server computer, a handheld device or a portable device, a flat panel device, a multi-processor apparatus, and a distributed computing environment including any one of the above apparatuses or devices.

The following clearly and completely describes the technical solutions in the embodiments of the present application with reference to the accompanying drawings in the embodiments of the present application. The described embodiments are merely a part rather than all of the embodiments of the present application. All other embodiments obtained by a person of ordinary skill in the art based on the embodiments of the present application without creative efforts shall fall within the protection scope of the present application.

Embodiment 1

A method for updating firmware according to Embodiment 1 of this application is applied to a communication device having an SD interface through which the communication device having the SD interface performs data communication with a mobile terminal, where the communication device having the SD interface includes an SD memory and a Flash memory, and the SD memory stores a command swap file, where the SD memory is a memory accessed by the mobile terminal through the SD interface, and the Flash memory is a memory storing the firmware in the communication device having the SD interface. The firmware refers to program codes written in an Erasable Programmable Read Only Memory (EPROM) or an Eraseable Read Only Memory (EROM). More simply, the firmware is software of a Basic Input Output System (BIOS), is program codes fixed in integrated circuits, and is responsible for controlling and coordinating functions of the integrated circuits.

In the embodiment of this application, the mobile terminal cannot directly access the Flash memory, and therefore, the mobile terminal cannot directly change data in the Flash memory. The SD memory and Flash memory may be two different chips on physical hardware, or may also share one chip.

It should be noted that the SD interface in the embodiment of this application does not support an SDIO function. When the SD interface does not support the SDIO function, the mobile terminal can only read and write data in the SD memory in units of files. Therefore, special files may be defined in the SD memory to store an update start command and update data in different files, so that the communication device having the SD interface can know, by identifying the file names, whether data in the files is an update start command or update data. The special files in the SD memory are respectively two special files: a command swap file and a firmware update file. In the two special files, the command swap file stores an update start command written by the mobile terminal, and the firmware update file stores update data. The communication device having the SD interface obtains data required in a firmware update process from the corresponding files.

FIG. 1 is a flowchart of a method for updating firmware according to Embodiment 1 of this application, where the method may include the following steps.

Step 101: Obtain an update start command from the command swap file.

In this embodiment, the mobile terminal performing data communication with the communication device having the SD interface detects whether a version number of the firmware in the communication device having the SD interface is consistent with a version number of the firmware program of the communication device having the SD interface which is stored on a server, and when detecting that the version numbers are inconsistent, determines that the firmware program of the communication device having the SD interface needs to be updated, and therefore the mobile terminal writes the update start command to the command swap file.

The format of the command swap file may be customized in any way, for example, the command swap file is defined as a binary file. The update start command in the command swap file may be written by the mobile terminal to the command swap file by using a small computer system interface (SCSI) command.

The SCSI command used to write the update start command to the command swap file may be: REQ 1 u. REQ indicates that the command is an update start command, 1 indicates a command sequence number, and u indicates starting of an update command.

It should be noted that multiple update start commands may be written to the command swap file. To distinguish between different update start commands, different command sequence numbers are used to identify update start commands. For example, REQ 1 u indicates a first update start command, and REQ 2 u indicates a second update start command. This embodiment only enumerates a manner of writing an update start command and a format of the update start command. Other writing manners and command formats also fall within the protection scope of this embodiment, and are not further enumerated one by one in this embodiment.

Step 102: After the update start command is obtained, read, from the SD memory, a firmware update file storing update data.

The firmware update file is downloaded by the mobile terminal from the server and written by the mobile terminal to the SD memory. The update data includes program codes for updating the firmware of the communication device having the SD interface.

The firmware update file is a binary file, and may include a file information header, firmware data, and check information. In this embodiment, the format of the firmware update file is the same as the format of an existing binary file, and is not further described in this embodiment.

After the communication device having the SD interface obtains the update start command, it indicates that the communication device having the SD interface starts to perform firmware update, and therefore, the communication device having the SD interface obtains the firmware update file from the SD memory.

It should be noted that in a case where the mobile terminal detects that the version number of the firmware program in the communication device having the SD interface is inconsistent with the version number of the firmware program of the communication device having the SD interface which is stored on the server, the mobile terminal first downloads the firmware update file and then writes it to the SD memory. After writing the firmware update file completely, the mobile terminal writes the update start command to the command swap file in the SD memory to ensure that the firmware update file has been written to the SD memory completely when the communication device having the SD interface starts to perform firmware update, thereby avoiding update failure caused by incomplete update data in the file.

Step 103: Write the firmware update file to the Flash memory.

In this embodiment, the firmware update principle is to write program codes in a new firmware update file to the Flash memory to replace the program codes that are stored in the Flash memory and read when the communication device having the SD interface is started. Therefore, after obtaining the firmware update file, the communication device having the SD interface further writes the firmware update file to the Flash memory, so as to change the program codes previously stored in the Flash memory to the program codes that are currently written to the firmware update file in the Flash memory, and complete the firmware update for the communication device having the SD interface.

When the communication device having the SD interface and the mobile terminal perform data communication, different files have different data. Therefore, the mobile terminal can write different data to corresponding files by identifying file names, and the communication device having the SD interface can know, by identifying the file names, whether the data written by the mobile terminal is an update start command or update data. When the communication device having the SD interface obtains the update start command from the command swap file, it indicates that the communication device having the SD interface starts to perform firmware update. Therefore, the communication device having the SD interface further reads, from the secure data memory, the firmware update file storing the update data, and then writes the firmware update file to the Flash memory to complete the firmware update.

It should be noted that some SD interfaces may support the SDIO function. When the SD interface used for data communication between the mobile terminal and the communication device having the SD interface supports the SDIO function, the communication device having the SD interface can use the method for updating firmware according to this embodiment, or can also use the existing firmware update method based on the SDIO function.

Embodiment 2

The method for updating firmware as described in Embodiment 1 solves the firmware update problem of a communication device having an SD interface when the SD interface does not support the SDIO function. However, because the communication device having the SD interface does not have an interface that may be used for man-machine interactions, a firmware update progress and status cannot be displayed in the communication device having the SD interface. In the method for updating firmware according to Embodiment 2 of this application, a mobile terminal may display the firmware update progress and status.

A method for updating firmware according to Embodiment 2 of this application is applied to a communication device having an SD interface through which the communication device having the SD interface performs data communication with a mobile terminal, where the communication device having the SD interface includes an SD memory and a Flash memory, and the SD memory stores a command swap file and a result swap file, where the SD memory is a memory accessed by the mobile terminal through the SD interface, and the Flash memory is a memory storing the firmware in the communication device having the SD interface.

Figure 2:
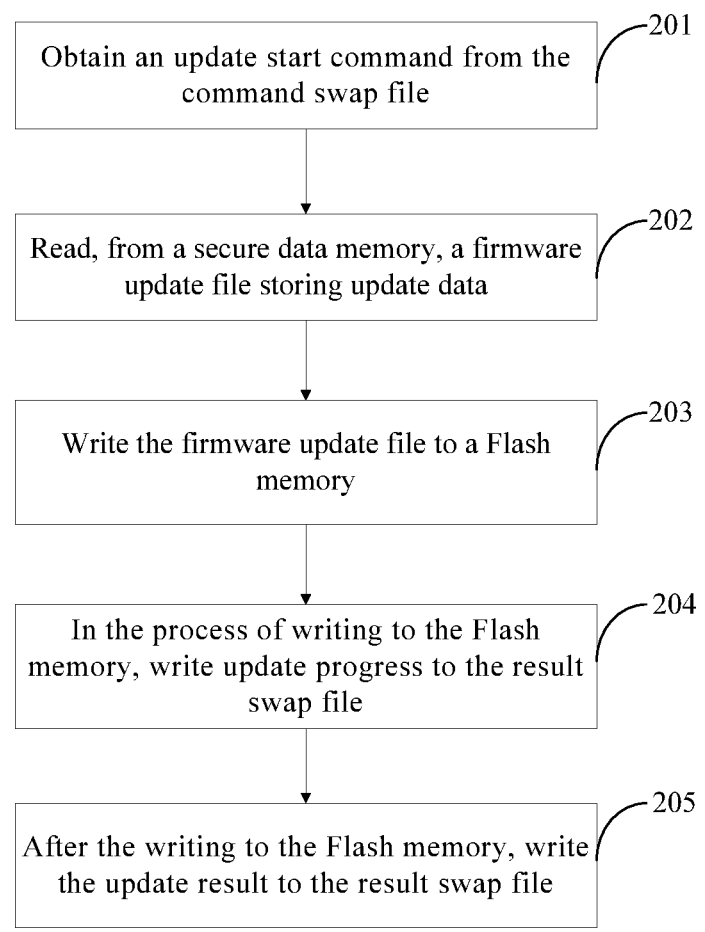
FIG. 2 is another flowchart of a method for updating firmware according to this application.

FIG. 2 is another flowchart of a method for updating firmware according to Embodiment 2 of this application, where the method may include the following steps.

Step 201: Obtain an update start command from the command swap file, where the update start command is written by the mobile terminal to the command swap file.

Step 202: After the update start command is obtained, read, from the SD memory, a firmware update file storing update data, where the firmware update file is downloaded by the mobile terminal and written by the mobile terminal to the secure data memory.

Step 203: Write the firmware update file to the Flash memory.

In this embodiment, the specific implementation process of step 201 to step 203 is the same as the specific implementation process of step 101 to step 103, and is not further described in this embodiment.

Step 204: In the process of writing the firmware update file to the Flash memory, write update progress to the result swap file.

Step 205: After the firmware update file is written to the Flash memory, write an update result to the result swap file.

The update progress indicates current progress of writing the firmware update file to the Flash memory. For example, the percentage of the size of the file written in the Flash memory to the total size of the firmware update file is used to indicate the update progress. The update result indicates the final result of the update, for example, update success or update failure. In this embodiment, the communication device having the SD interface may use different identifiers to indicate update success or update failure.

In this embodiment, the update progress and update result may be written to the result swap file by using an SCSI command. The SCSI command used to write the update progress to the result swap file may be: RSQ 1 m %, where 1 indicates a command sequence number and corresponds to the command sequence number of the update start command, and m % indicates progress. The communication device having the SD interface may periodically change the update progress every time when a firmware update is performed.

The SCSI command used to write the update result to the result swap file may be: RSP 1 s, where 1 indicates a command sequence number and corresponds to the command sequence number of the update start command, and s indicates that the update is successful. If the update fails, f is returned to indicate update failure.

When the mobile terminal queries the firmware update status, the result swap file may be obtained from the SD memory. After the mobile terminal obtains the result swap file, the mobile terminal further obtains the update progress and update result from the result swap file, and thereby displays the firmware update progress and status on the mobile terminal, so as to solve the problem that the firmware update progress and status cannot be displayed because the communication device having the SD interface does not include a display. As can be seen from the above, the method for updating firmware according to Embodiment 2 of this application may further display the firmware update progress and status on the mobile terminal while implementing a firmware update.

The specific process of obtaining the result swap file from the SD memory by the mobile terminal may be, after obtaining an update status query command from the command swap file, sending, by the communication device having the SD interface, the result swap file to the mobile terminal, where the update status query is written by the mobile terminal to the command swap file, and indicates that the mobile terminal needs to query the firmware update process. In this case, the communication device having the SD interface needs to send the result swap file to the mobile terminal.

In this embodiment, the update status query command may also be written to the command swap file by using an SCSI, for example, REP 1 q. REP indicates that the command is an update status query command, 1 indicates a command sequence number, and u indicates starting of status query.

It should be noted that the format of the result swap file may be customized in any way, for example, the result swap file may use the format of an existing binary file. Multiple update results may be written in the result swap file. To distinguish between different update results, different command sequence numbers are used to identify update results, and furthermore, a same command sequence number is used to identify an update start command and a corresponding update result. For example, REQ 1 u indicates a first update start command, and the corresponding update result may be RSP 1 s. REQ 2 u indicates a second update start command, and the corresponding update result may be RSP 2 s. This embodiment only enumerates a manner of writing an update status query command and a format of the update status query command. Other writing manners and command formats also fall within the protection scope of this embodiment, and are not further enumerated one by one in this embodiment.

Embodiment 3

Figure 3:
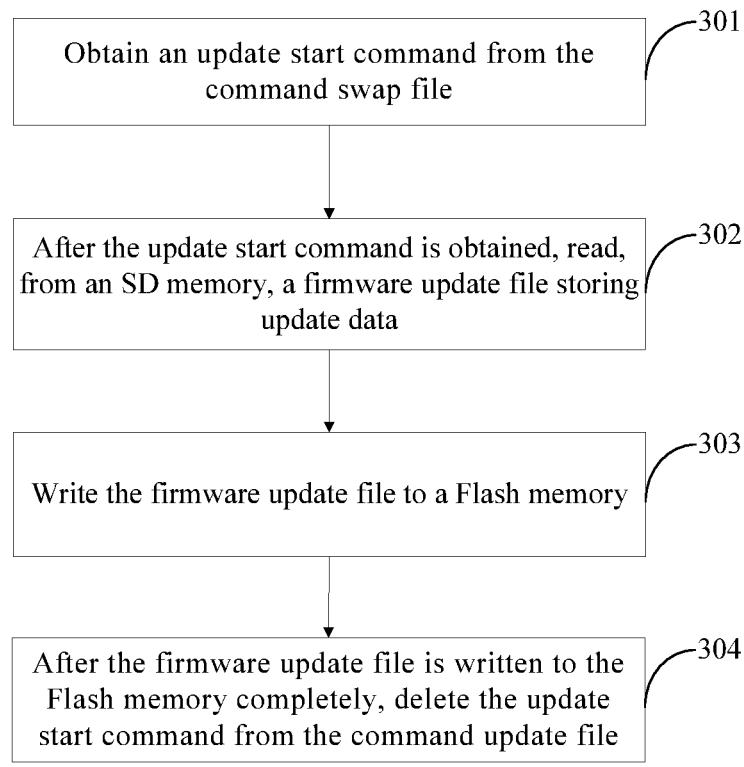
FIG. 3 is still another flowchart of a method for updating firmware according to this application.

FIG. 3 is another schematic structural diagram of a method for updating firmware according to Embodiment 3 of this application. The method is applied to a communication device having an SD interface through which the communication device having the SD interface performs data communication with a mobile terminal, where the communication device having the SD interface includes an SD memory and a Flash memory, and the SD memory stores a command swap file, where the SD memory is a memory accessed by the mobile terminal through the SD interface, and the Flash memory is a memory storing the firmware in the communication device having the SD interface.

The method for updating firmware shown in FIG. 3 may include the following steps.

Step 301: Obtain an update start command from the command swap file, where the update start command is written by the mobile terminal to the command swap file.

Step 302: After the update start command is obtained, read, from the secure data memory, a firmware update file storing update data, where the firmware update file is downloaded by the mobile terminal and written by the mobile terminal to the secure data memory.

Step 303: Write the firmware update file to the Flash memory.

In this embodiment, the specific implementation process of step 301 to step 303 is the same as the specific implementation process of step 101 to step 103, and is not further described in this embodiment.

Step 304: After the firmware update file is written to the Flash memory completely, delete the update start command from the command update file.

Because multiple update start commands may be written in the command update file, to avoid interference of the remaining update start command in the command swap file after the previous update, during the next update, after the firmware update file is written to the Flash memory completely, the update start command written in the command update file is deleted.

Of course, in the communication device having the SD interface to which the method for updating firmware shown in FIG. 3 is applied, the SD memory further stores a result swap file, where the result swap file may store update progress and an update result, and the result swap file may be further sent to the mobile terminal. The update progress and update result are displayed on the mobile terminal. For details, reference may be made to the description about the result swap file in the method for updating firmware shown in FIG. 2, which is not further described in this embodiment.

The methods for updating firmware according to all the above method embodiments need to be implemented in the update mode of the communication device having the SD interface, but the communication device having the SD interface runs in the common running mode after power-on. Therefore, after the communication device having the SD interface obtains the update start command, it is necessary to restart the communication device having the secure data interface, enter the update mode of the communication device having the secure data interface, and then in the update mode, read, from the secure data memory, the firmware update file storing the update data. After the firmware update file is written to the Flash memory completely, the communication device having the secure data interface is restarted to enter the common running mode of the communication device having the secure data interface.

The common running mode is a running mode in which an operating system that the communication device having the SD interface runs may provide various service functions for a user, and the update mode is a running mode in which an operating system that the communication device having the SD interface runs may provide only an update service function for a user.

In all the foregoing method embodiments, the writing the firmware update file to the Flash memory by the communication device having the SD interface may include writing mirroring data of the firmware update file to the Flash memory, that is, using new program codes in the firmware update file to replace the program codes that are originally stored in the Flash memory. When the new program codes are written to the Flash memory completely, the firmware update of the communication device having the SD interface is completed. When the communication device having the SD interface runs again, the new program codes in the Flash memory can be directly run.

Of course, in all the foregoing embodiments, after the firmware update file is written to the SD memory completely, the communication device having the SD interface needs to further check the firmware update file to determine whether the firmware update file is a valid file, so that running errors of the communication device having the SD interface, which are caused by writing an invalid file to the Flash memory, are avoided, where the valid file indicates that the firmware update file is a file that can be used and is not changed by other users than an operator. In this embodiment, when checking the firmware update file, the communication device having the SD interface may use an existing checking method for checking, which is not further described in this embodiment.

All the foregoing method embodiments are described from the perspective of a communication device having an SD interface. The following introduces the method for updating firmware according to an embodiment of this application from the perspective of a mobile terminal.

Embodiment 4

A method for updating firmware according to Embodiment 4 of this application is applied to a mobile terminal, where the mobile terminal performs data communication through an SD interface with a communication device having an SD interface, where the communication device having the SD interface includes an SD memory and a Flash memory, and the SD memory stores a command swap file, where the SD memory is a memory accessed by the mobile terminal through the SD interface, and the Flash memory is a memory storing the firmware in the communication device having the SD interface.

The firmware is a program written in an EPROM or EROM. In the embodiment of this application, the mobile terminal cannot directly access the Flash memory, and therefore, the mobile terminal cannot directly change data in the Flash memory. The SD memory and Flash memory may be two different chips on physical hardware, or may also share one chip.

It should be noted that the SD interface in the embodiment of this application does not support an SDIO function. When the SD interface does not support the SDIO function, the mobile terminal can only read and write data in the SD memory in units of files. Therefore, special files may be defined in the SD memory to store an update start command and update data in different files, so that the communication device having the SD interface can know whether data stored in the files is an update start command or update data. The special files in the SD memory are respectively two special files: a command swap file and a firmware update file. The mobile terminal may respectively write the update start command and update data to the two special files, and the communication device having the SD interface obtains data required in the firmware update process from the corresponding files.

Figure 4:
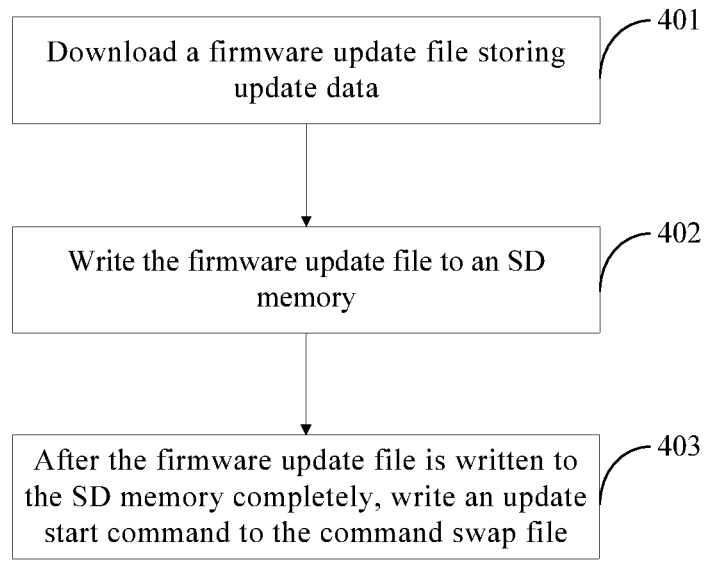
FIG. 4 is still another flowchart of a method for updating firmware according to this application.

FIG. 4 is a flowchart of a method for updating firmware according to Embodiment 4 of this application, where the method may include the following steps.

Step 401: Download a firmware update file storing update data.

In this embodiment, the mobile terminal detects whether a version number of the firmware program in the communication device having the SD interface is consistent with a version number of the firmware program of the communication device having the SD interface which is stored on a server, and when detecting that the version numbers are inconsistent, determines that the firmware program of the communication device having the SD interface needs to be updated, and therefore the mobile terminal downloads, from the server, the firmware update file storing the update data.

The firmware update file is a binary file, and may include a file information header, firmware data, and check information. In this embodiment, the format of the firmware update file is the same as the format of an existing binary file, and is not further described in this embodiment.

Step 402: Write the firmware update file to the SD memory.

Step 403: After the firmware update file is written to the SD memory completely, write an update start command in the mobile terminal to the command swap file, so that the communication device having the SD interface obtains the update start command to perform firmware update.

After the firmware update file is written to the SD memory completely, the mobile terminal further writes an update start command in the command swap file. The communication device having the SD interface can know, by identifying a file name, that the command swap file stores an update start command. Therefore, the communication device having the SD interface polls the command update file to obtain the update start command after the update start command is written completely. Polling the command update file means periodically querying whether the complete update start command is written in the command update file.

After the communication device having the SD interface obtains the update start command, it indicates that the communication device having the SD interface starts to perform firmware update. Therefore, the communication device having the SD interface further obtains the firmware update file, and writes the firmware update file to the Flash memory to complete the firmware update.

It should be noted that writing of the firmware update file is better than writing of the update start command, so as to ensure integrity of the firmware update file written in the SD memory, thereby avoiding update failure caused by an incomplete firmware update file in the SD memory when the update start command is executed.

In addition, in the process of performing a firmware update process by the communication device having the SD interface, the mobile terminal further writes an update status query command to the command swap file. When obtaining the update status query command, the communication device having the SD interface sends a result swap file to the mobile terminal. The update progress and update result are written in the result swap file. Therefore, when receiving the result swap file, the mobile terminal can display the update progress and update result on the mobile terminal.

The mobile terminal may periodically write the update status query command to the command swap file in each firmware update process. Every time when obtaining the update status query command, the communication device having the SD interface sends, to the mobile terminal, the result swap file in which update progress is written, so that the mobile terminal can monitor the update progress in real time. When the communication device having the SD interface obtains the final update status query command in a firmware update process, the communication device having the SD interface may send, to the mobile terminal, the result swap file in which the final update progress and update result are written, thereby displaying the final update result on the mobile terminal.

It should be noted that the update start command and update status query command in this embodiment may be written by using an SCSI command. For the format of the SCSI command, reference may be made to the method for updating firmware which is described from the perspective of the communication device having the SD interface, which is not further introduced in this embodiment. Formats of the command swap file and result swap file may be customized in any way, for example, the command swap file and result swap file may use the format of an existing binary file.

Embodiment 5

Corresponding to the method embodiment shown in Embodiment 1, this embodiment provides an apparatus for updating firmware. The apparatus for updating firmware is applied to a communication device having an SD interface through which the communication device having the SD interface performs data communication with a mobile terminal, where the communication device having the SD interface includes an SD memory and a Flash memory, and the SD memory stores a command swap file, where the SD memory is a memory accessed by the mobile terminal through the SD interface, and the Flash memory is a memory storing the firmware in the communication device having the SD interface. The firmware is program codes written in an EPROM or EROM.

It should be noted that the mobile terminal performing data communication with the communication device having the SD interface cannot directly access the Flash memory, and therefore, the mobile terminal cannot directly change data in the Flash memory. The SD memory and Flash memory may be two different chips on physical hardware, or may also share one chip.

In this embodiment, the SD interface does not support an SDIO function. When the SD interface does not support the SDIO function, the mobile terminal can only read and write data in the SD memory in units of files. Therefore, special files may be defined in the SD memory to store an update start command and update data in different files, so that the communication device having the SD interface can know, by identifying the file names, whether the data in the files is an update start command or update data. The special files in the SD memory are respectively two special files: a command swap file and a firmware update file. In the two special files, the command swap file stores an update start command written by the mobile terminal, and the firmware update file stores update data. The communication device having the SD interface obtains data required in a firmware update process from the corresponding files.

Figure 5:
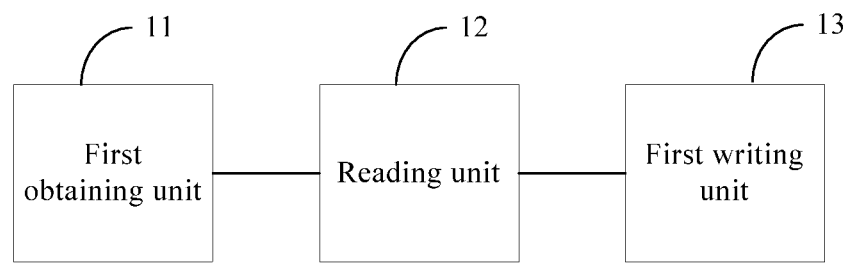
FIG. 5 is a schematic structural diagram of an apparatus for updating firmware according to this application.

FIG. 5 is a schematic structural diagram of an apparatus for updating firmware according to an embodiment of this application. The apparatus may include a first obtaining unit 11, a reading unit 12, and a first writing unit 13.

The first obtaining unit 11 is configured to obtain an update start command from the command swap file, where the update start command is written by the mobile terminal to the command swap file.

When the mobile terminal detects that a version number of the firmware program in the communication device having the SD interface is inconsistent with a version number of the firmware program of the communication device having the SD interface which is stored on a server, the mobile terminal determines that the firmware program of the communication device having the SD interface needs to be updated, and the mobile terminal writes the update start command to the command swap file. The update start command indicates that the firmware in the communication device having the SD interface needs to be updated. When the first obtaining unit 11 obtains the update start command, firmware update is started.

The format of the command swap file is customized in any way, for example, the command swap file is defined as a binary file. The update start command in the command swap file may be written by the mobile terminal to the command swap file by using an SCSI command. For the specific format, reference may be made to the command format enumerated in Embodiment 1.

The reading unit 12 is configured to, after the update start command is obtained, read, from the SD memory, a firmware update file storing update data.

The firmware update file is downloaded by the mobile terminal and written by the mobile terminal to the SD memory. The update data includes program codes for updating the firmware of the communication device having the SD interface. The firmware update file is a binary file, and may include a file information header, firmware data, and check information. In this embodiment, the format of the firmware update file is the same as that of an existing binary file, and is not further described in this embodiment.

After the obtaining unit 12 obtains the update start command, it indicates that the communication device having the SD interface starts to perform firmware update, and therefore, the communication device having the SD interface obtains the firmware update file from the SD memory.

It should be noted that in a case where the mobile terminal detects that the version number of the firmware program in the communication device having the SD interface is inconsistent with the version number of the firmware program of the communication device having the SD interface which is stored on the server, the mobile terminal first downloads the firmware update file and then writes it to the SD memory. After writing the firmware update file completely, the mobile terminal writes the update start command to the command swap file in the SD memory to ensure that the firmware update file has been written to the SD memory completely when the communication device having the SD interface starts to perform firmware update, thereby avoiding update failure caused by incomplete update data in the file.

The first writing unit 13 is configured to write the firmware update file to the Flash memory.

In this embodiment, the firmware update principle is to write program codes in a new firmware update file to the Flash memory to replace the program codes that are stored in the Flash memory and read when the communication device having the SD interface is started. Therefore, after the reading unit 12 obtains the firmware update file, the first writing unit further writes the firmware update file to the Flash memory, so as to change the program codes previously stored in the Flash memory to program codes that are currently written to the firmware update file in the Flash memory, and complete the firmware update for the communication device having the SD interface.

When the communication device having the SD interface and the mobile terminal perform data communication, different files have different data. Therefore, the mobile terminal can write different data to corresponding files by identifying file names, and the communication device having the SD interface can know, by identifying the file names, whether the data written by the mobile terminal is an update start command or update data. When the communication device having the SD interface obtains the update start command from the command swap file, it indicates that the communication device having the SD interface starts to perform firmware update. Therefore, the communication device having the SD interface further reads, from the secure data memory, the firmware update file storing the update data, and then writes the firmware update file to the Flash memory to complete the firmware update.

Embodiment 6

Figure 6:
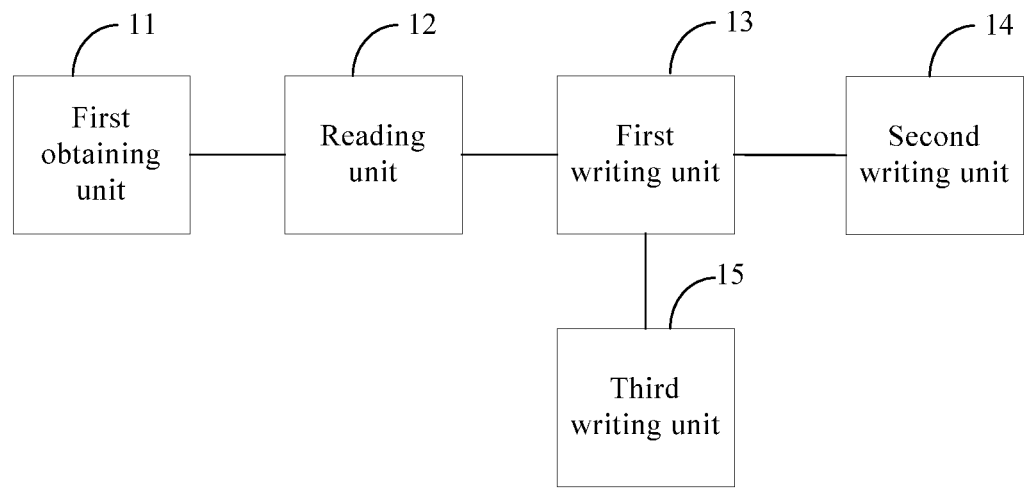
FIG. 6 is a schematic structural diagram of another apparatus for updating firmware according to this application.

Corresponding to the method embodiment shown in Embodiment 2, the embodiment of this application provides another apparatus for updating firmware, where a schematic structural diagram of the apparatus is shown in FIG. 6. The apparatus may include a first obtaining unit 11, a reading unit 12, a first writing unit 13, a second writing unit 14, and a third writing unit 15.

The first obtaining unit 11 is configured to obtain an update start command from the command swap file, where the update start command is written by the mobile terminal to the command swap file.

The reading unit 12 is configured to, after the update start command is obtained, read, from the SD memory, a firmware update file storing update data. The firmware update file is downloaded by the mobile terminal and written by the mobile terminal to the SD memory. The update data includes program codes for updating the firmware of the communication device having the SD interface.

The first writing unit 13 is configured to write the firmware update file to the Flash memory.

For details about the specific functions and implementations of the first obtaining unit 11, the reading unit 12, and the first writing unit 13 in this embodiment, reference may be made to the description of the apparatus for updating firmware shown in Embodiment 5, which is not further described in this embodiment.

The second writing unit 14 is configured to write update progress to the result swap file in the process of writing the firmware update file to the Flash memory.

The third writing unit 15 is configured to write the update result to the result swap file after the firmware update file is written to the Flash memory.

The update progress indicates current progress of writing the firmware update file to the Flash memory. For example, the percentage of the size of the file written in the Flash memory to the total size of the firmware update file is used to indicate the update progress. The update result indicates the final result of the update, for example, update success or update failure. In this embodiment, the communication device having the SD interface may use different identifiers to indicate update success or update failure.

In this embodiment, the second writing unit 14 writes the update progress to the result swap file by using an SCSI command. The third writing unit 15 writes the update result to the result swap file by using an SCSI command. For details about the specific execution processes of the second writing unit 14 and the third writing unit 15, reference may be made to the description of the method for updating firmware shown in Embodiment 2, which is not further introduced in this embodiment.

In this embodiment, the second writing unit 14 may write the update progress to the result swap file. The third writing unit 15 may write the update result to the result swap file. Therefore, the mobile terminal can further obtain the result swap file by identifying a file name, read the update progress and update result from the result swap file, and display the update progress and status on the mobile terminal, thereby solving the problem that the communication device having the SD interface cannot display the firmware update progress and status.

The specific process of obtaining the result swap file from the SD memory by the mobile terminal may be, after obtaining an update status query command from the command swap file, sending, by the communication device having the SD interface, the result swap file to the mobile terminal, where the update status query is written by the mobile terminal to the command swap file, and indicates that the mobile terminal needs to query the firmware update status. In this case, the communication device having the SD interface needs to send the result swap file to the mobile terminal.

Figure 7:
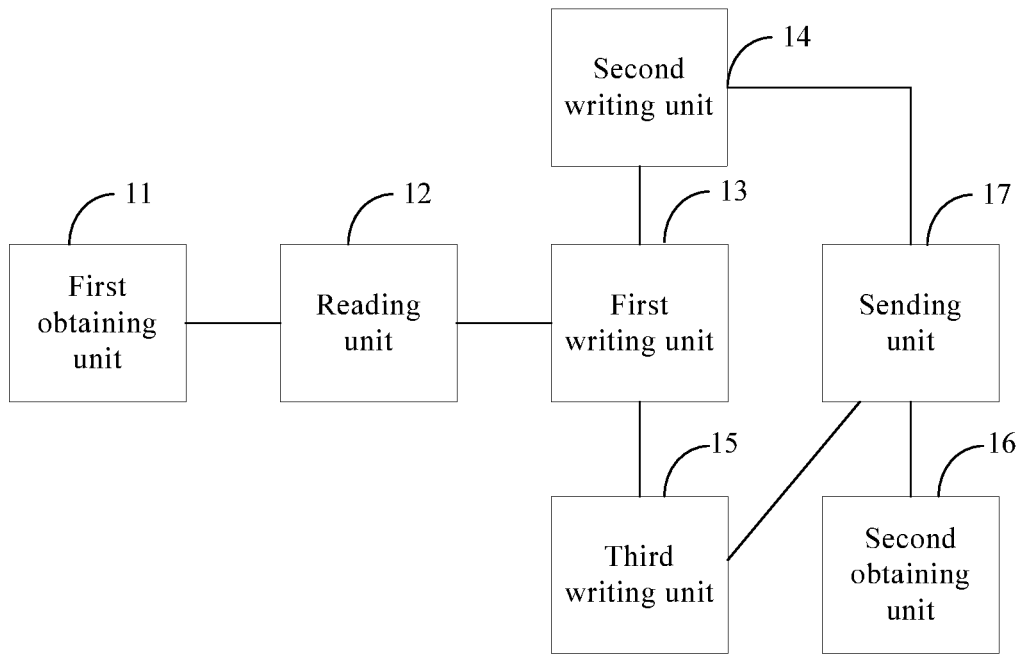
FIG. 7 is a schematic structural diagram of another apparatus for updating firmware according to this application.

FIG. 7 is another schematic structural diagram of an apparatus for updating firmware according to Embodiment 6 on the basis of FIG. 6. The apparatus may further include a second obtaining unit 16 and a sending unit 17.

The second obtaining unit 16 is configured to obtain an update status query command from the command swap file.

The sending unit 17 is configured to send the result swap file to the mobile terminal after the update status query command is obtained, where the update progress and update result are written in the result swap file.

The update status query command is a command used for a user to query the firmware update process of the communication device having the SD interface. When the update status query command is obtained, it indicates that the mobile terminal needs to query the firmware update process, and therefore the second obtaining unit 16 triggers the sending unit 17 to send the result swap file to the mobile terminal. For details about the format of the update status query command in this embodiment, reference may be made to the introduction of the method for updating firmware shown in Embodiment 2, which is not further described herein.

Embodiment 7

Figure 8:
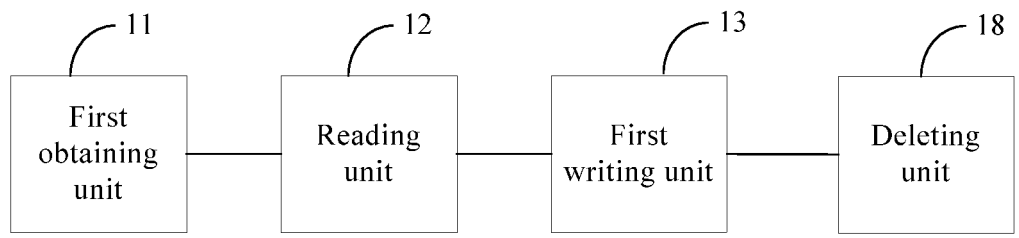
FIG. 8 is a schematic structural diagram of another apparatus for updating firmware according to this application.

Corresponding to the method embodiment shown in Embodiment 3, the embodiment of this application provides another apparatus for updating firmware, where a schematic structural diagram of the apparatus is shown in FIG. 8. The apparatus may include a first obtaining unit 11, a reading unit 12, a first writing unit 13, and a deleting unit 18.

The first obtaining unit 11 is configured to obtain an update start command from the command swap file, where the update start command is written by the mobile terminal to the command swap file.

The reading unit 12 is configured to, after the update start command is obtained, read, from the SD memory, a firmware update file storing update data. The firmware update file is downloaded by the mobile terminal and written by the mobile terminal to the SD memory. The update data includes program codes for updating the firmware of the communication device having the SD interface.

The first writing unit 13 is configured to write the firmware update file to the Flash memory.

For details about the specific functions and implementations of the first obtaining unit 11, the reading unit 12, and the first writing unit 13 in this embodiment, reference may be made to the detailed description of the apparatus for updating firmware shown in Embodiment 5, which is not further described in this embodiment.

The deleting unit 18 is configured to delete the update start command from the command update file after the firmware update file is written to the Flash memory completely.

Because multiple update start commands may be written in the command update file, to avoid interference of the remaining update start command in the command swap file after the previous update, during the next update, after the firmware update file is written to the Flash memory completely, the update start command written in the command update file is deleted.

Of course, the apparatus for updating firmware according to this embodiment may further include the second writing unit 14 and the third writing unit 15 in FIG. 6, and the second obtaining unit 16 and the sending unit 17 in FIG. 7. Therefore, the apparatus for updating firmware can send the result swap file to the mobile terminal. The mobile terminal further reads the update progress and update result from the result swap file, and displays the firmware update progress and status on the mobile terminal, so as to solve the problem that the communication device having the SD interface cannot display the firmware update progress and status.

Embodiment 8

Figure 9:
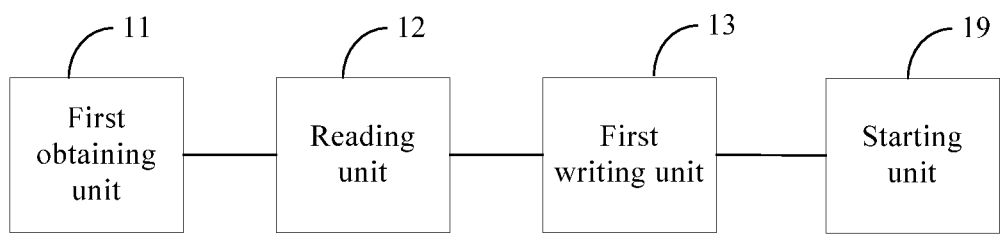
FIG. 9 is a schematic structural diagram of another apparatus for updating firmware according to this application.

FIG. 9 is a schematic structural diagram of another apparatus for updating firmware according to an embodiment of this application. The apparatus may include a first obtaining unit 11, a reading unit 12, a first writing unit, and a starting unit 19.

The first obtaining unit 11 is configured to obtain an update start command from the command swap file, where the update start command is written by the mobile terminal to the command swap file.

The starting unit 19 is configured to, after the update start command is obtained, restart the communication device having the secure data interface, and enter an update mode of the communication device having the secure data interface, and after the firmware update file is written to the Flash memory completely, restart the communication device having the secure data interface, and enter a common running mode of the communication device having the secure data interface.

In this embodiment, the common running mode is a running mode in which an operating system that the communication device having the SD interface runs may provide various service functions for a user, and the update mode is a running mode in which an operating system that the communication device having the SD interface runs may provide only an update service function for a user.

Of course, the starting unit 19 may also be applied to the apparatuses for updating firmware shown in FIG. 5 to FIG. 8, so as to control the operation mode of the communication device having the SD interface, which is not further described in this embodiment one by one with reference to schematic diagrams.

The reading unit 12 is configured to read, in the update mode from the secure data memory, the firmware update file storing the update data. The firmware update file is downloaded by the mobile terminal and written by the mobile terminal to the SD memory. The update data includes program codes for updating the firmware of the communication device having the SD interface.

The first writing unit 13 is configured to write the firmware update file to the Flash memory.

For details about the specific functions and implementations of the first obtaining unit 11, the reading unit 12, and the first writing unit 13 in this embodiment, reference may be made to the description of the apparatus for updating firmware shown in Embodiment 5, which is not further described in this embodiment.

In all the foregoing apparatus embodiments, the first writing unit 13 is configured to write mirroring data of the firmware update file to the Flash memory, that is, use new program codes in the firmware update file to replace program codes originally stored in the Flash memory. When the new program codes are written to the Flash memory completely, the firmware update of the communication device having the SD interface is completed. When the communication device having the SD interface runs again, the new program codes in the Flash memory can be directly run.

Of course, in all the foregoing apparatus embodiments, the apparatus for updating firmware may further include a checking unit configured to check the firmware update file. The reading unit 12 is configured to, after it is checked that the firmware update file is a valid file, read, from the SD memory, the firmware update file storing the update data.

The checking unit checks the firmware update file to determine whether the firmware update file is a valid file, so that running errors of the communication device having the SD interface, which are caused by writing an invalid file to the Flash memory, are avoided, where the valid file indicates that the firmware update file is a file that can be used and is not changed by other users than an operator. In this embodiment, when checking the firmware update file, the checking unit may use an existing checking method for checking, which is not further described in this embodiment.

The apparatus for updating firmware shown in any one of the schematic structural diagrams in FIG. 5 to FIG. 9 may be included in a communication device having an SD interface, where the communication device having the SD interface includes an SD memory and a Flash memory, the apparatus for updating firmware performs data communication with the SD memory and the Flash memory respectively, and the SD memory stores a command swap file, where the SD memory is a memory accessed by the mobile terminal through the SD interface, and the Flash memory is a memory storing the firmware in the communication device having the SD interface.

Embodiment 9

Figure 10:
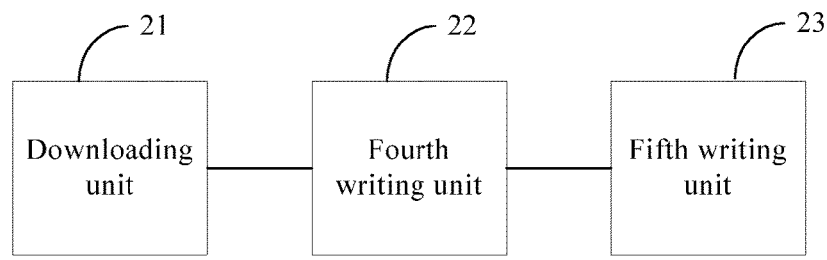
FIG. 10 is a schematic structural diagram of another apparatus for updating firmware according to this application.

FIG. 10 is a schematic structural diagram of another apparatus for updating firmware according to an embodiment of this application. The apparatus for updating firmware is applied to a mobile terminal that performs data communication through an SD interface with a communication device having an SD interface, where the communication device having the SD interface includes an SD memory and a Flash memory, and the SD memory stores a command swap file, where the SD memory is a memory accessed by the mobile terminal through the SD interface, and the Flash memory is a memory storing the firmware in the communication device having the SD interface.

In this embodiment, the apparatus for updating firmware may include a downloading unit 21, a fourth writing unit 22, and a fifth writing unit 23.

The downloading unit 21 is configured to download a firmware update file storing update data.

In this embodiment, the mobile terminal detects whether a version number of the firmware program in the communication device having the SD interface is consistent with a version number of the firmware program of the communication device having the SD interface which is stored on a server, and when detecting that the version numbers are inconsistent, determines that the firmware program of the communication device having the SD interface needs to be updated, and therefore the downloading unit 21 downloads, from the server, the firmware update file storing the update data.

The firmware update file is a binary file, and may include a file information header, firmware data, and check information. In this embodiment, the format of the firmware update file is the same as the format of an existing binary file, and is not further described in this embodiment.

The fourth writing unit 22 is configured to write the firmware update file to the SD memory.

The fifth writing unit 23 is configured to, after the firmware update file is written to the SD memory completely, write an update start command in the mobile terminal to the command swap file, so that the communication device having the SD interface obtains the update start command to perform firmware update.

After the fourth writing unit 22 writes the firmware update file to the SD memory completely, the fifth writing unit 23 further writes an update start command in the command swap file. The communication device having the SD interface can know, by identifying a file name, that the command swap file stores an update start command. Therefore, the communication device having the SD interface polls the command update file to obtain the update start command after the update start command is written completely. Polling the command update file means periodically querying whether the complete update start command is written in the command update file.

After the communication device having the SD interface obtains the update start command, it indicates that the communication device having the SD interface starts to perform firmware update. Therefore, the communication device having the SD interface further obtains the firmware update file, and writes the firmware update file to the Flash memory to complete the firmware update. For details about how a communication device having an SD interface performs firmware update, reference may be made to the method for updating firmware applied to the communication device having the SD interface, which is not further described in this embodiment.

Embodiment 10

Figure 11:
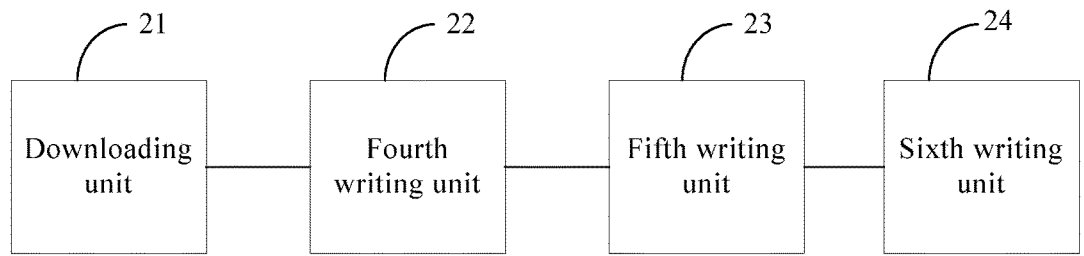
FIG. 11 is a schematic structural diagram of another apparatus for updating firmware according to this application.

FIG. 11 is a schematic structural diagram of another apparatus for updating firmware according to an embodiment of this application. On the basis of FIG. 10, the apparatus may further include a sixth writing unit 24 configured to write an update status query command in the mobile terminal to the command swap file.

The update status query command is a command for querying the firmware update process of the communication device having the SD interface. After obtaining the update status query command, the communication device having the SD interface sends, to the mobile terminal, a result swap file in which the update progress and update result are written, so that the update progress and update result are displayed on the mobile terminal, thereby solving the problem that the firmware update progress and status cannot be displayed because the communication device having the SD interface does not include a display. For details, reference may be made to the apparatus for updating firmware shown in FIG. 12.

Figure 12:
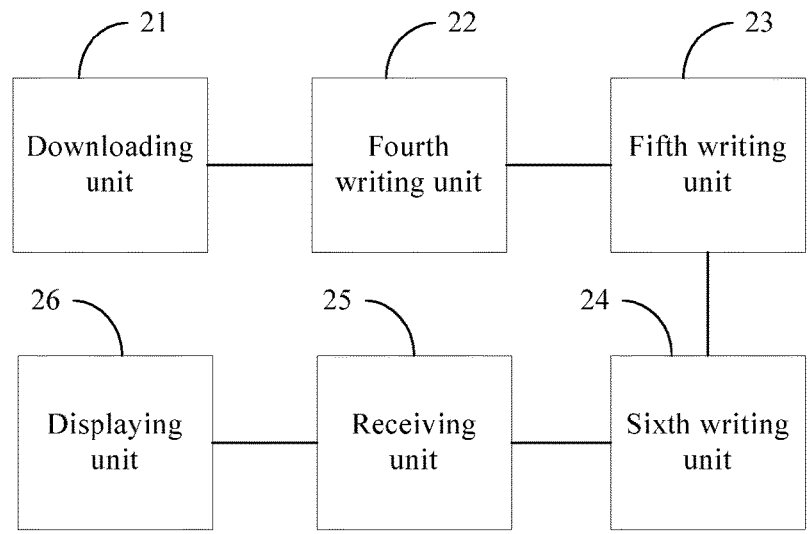
FIG. 12 is a schematic structural diagram of another apparatus for updating firmware according to this application.

The apparatus for updating firmware shown in FIG. 12, on the basis of FIG. 11, may further include a receiving unit 25 and a displaying unit 26.

The receiving unit 25 is configured to receive the result swap file sent by the communication device having the SD interface, where the result swap file is sent after the communication device having the SD interface obtains the update status query command, and the update progress and update result are written in the result swap file.

The displaying unit 26 is configured to display the update progress and update result on the mobile terminal.

In this embodiment, the fifth writing unit 23 writes the update start command to the command swap file by using an SCSI command. The sixth writing unit 24 writes the update status query command to the command swap file by using an SCSI command. For details, reference may be made to the corresponding method embodiment.

The embodiment of this application further provides a mobile terminal, where the mobile terminal includes an apparatus for updating firmware. For the schematic structural diagram of the apparatus for updating firmware, reference may be made to any one of the schematic structural diagrams in FIG. 10 to FIG. 12. Therefore, the apparatus for updating firmware is not further described in detail in this embodiment.

In addition, the embodiment of this application further provides a communication device having an SD interface, where the communication device having the SD interface is configured with only an SD interface 21, and includes an SD memory 22, a Flash memory 23, a processor 24, and an SD interface controller 25. For the schematic structural diagram of the communication device, reference may be made to FIG. 13.

The SD interface 21 connects the communication device having the SD interface and the mobile terminal through an SD bus, and the data communication between the communication device having the SD interface and the mobile terminal is transmitted on the SD bus under control of the SD interface controller 25. In this embodiment, the SD bus is a hardware bus complying with an SD interface standard, between the communication device having the SD interface and the mobile terminal.

The processor 24 is configured to obtain an update start command from a command swap file in the SD memory 22, read the firmware update file from the SD memory 22 after obtaining the update start command, and write the firmware update file to the Flash memory 23 to update firmware in the communication device having the SD interface.

Figure 14:
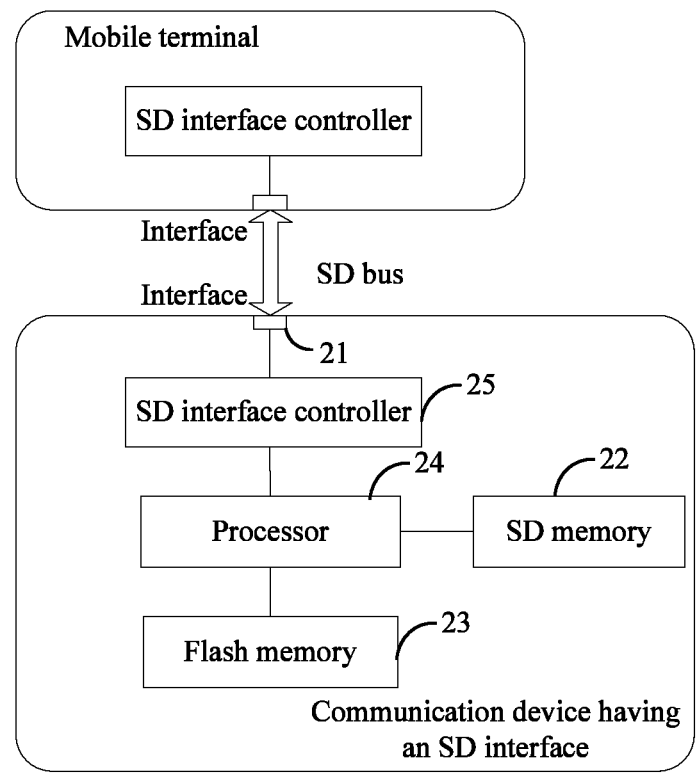
FIG. 14 is a schematic diagram of a connection between a communication device having an SD interface and a mobile terminal according to this application.

In this embodiment, the mobile terminal connected to the communication device having the SD interface is also configured with an SD interface. The SD interface is connected, through the SD bus, to the SD interface on the communication device having the SD interface, and performs data communication under control of the SD interface controller in the mobile terminal. For the schematic diagram of a connection between the communication device having the SD interface and the mobile terminal, reference may be made to FIG. 14. FIG. 14 shows a part of the structure of the mobile terminal and the structure of the communication device having the SD interface.

When the communication device having the SD interface performs an update process, the SD bus connecting the SD interface between the mobile terminal and the communication device having the SD interface establishes a connection under control of the SD interface controllers in the mobile terminal and the communication device having the SD interface. When update is started, the mobile terminal writes the firmware update file to the SD memory 22 through the SD bus connecting the SD interface. After the firmware update file is written to the SD memory completely, the mobile terminal writes the update start command to the command swap file in the SD memory 22. The processor 24 can know, by identifying a file name, that the command swap file stores an update start command. Therefore, the processor 24 polls the command swap file to obtain the update start command after the update start command is written completely.

After obtaining the update start command, the processor 24 reads the firmware update file from the SD memory 22, and writes the firmware update file to the Flash memory 23 to update the firmware in the communication device having the SD interface.

In the process of writing the firmware update file to the Flash memory 23, the processor 24 may further write the update progress and update result to the result swap file in the SD memory 22. In addition, after the processor 24 reads an update status query command in the command swap file, the processor 24 reads the update progress and update result from the result swap file, and sends the update progress and update result to the mobile terminal, so that the mobile terminal can display the update progress and update result to implement man-machine interactions. The update status query command is written by the mobile terminal to the command swap file in the SD memory 22.

In this embodiment, the update start command, update status query command, update progress, and update result may be written by using different SCSI commands. For details, reference may be made to the related description in the method embodiments, which is not further described in this embodiment.

In addition, to avoid interference of the remaining update start command in the command swap file after the previous update, during the next update, the processor 24 is further configured to, after the firmware update file is written to the Flash memory completely, delete the update start command written in the command update file.

The communication device having the SD interface needs to perform an actual update process in the update mode, but the communication device having the SD interface runs in the common running mode after power-on. Therefore, the processor 24 is further configured to restart the communication device having the SD interface after obtaining the update start command, so that the communication device having the SD interface switches from the common running mode to the update mode, obtains the firmware update file from the SD memory 22 in the update mode, and writes the firmware update file to the Flash memory 23. After the firmware update file is written to the Flash memory 23 completely, the processor 24 is further configured to restart the communication device having the SD interface, so that the communication device having the SD interface switches from the update mode to the common running mode, so as to ensure that the mobile terminal can normally use the communication device having the SD interface.

In this embodiment, the processor 24 is configured to write mirroring data of the firmware update file to the Flash memory, that is, use the new firmware program in the firmware update file to replace the firmware program that is originally stored in the Flash memory. When the new firmware program is written to the Flash memory completely, the firmware update of the communication device having the SD interface is completed. When the communication device having the SD interface runs again, the new firmware program in the Flash memory can be directly run.

After the firmware update file is written to the SD memory 22 completely, the processor 24 further checks the firmware update file before obtaining the update start command, and obtains the update start command after checking that the firmware update file is a valid file, so that running errors of the communication device having the SD interface, which are caused by writing an invalid file to the Flash memory, are avoided, where the valid file indicates that the firmware update file is a file that can be used and is not changed by other users than an operator.

It should be noted that after the firmware update file is written to the SD memory completely, the mobile terminal writes the update start command to the command swap file, that is, writing of the firmware update file is better than writing of the update start command, so as to ensure that the firmware update file may be written to the SD memory 22 completely, ensure integrity of the firmware update file written in the SD memory 22, and avoid update failure caused by an incomplete firmware update file in the SD memory 22 when the update start command is executed.

Figure 13:
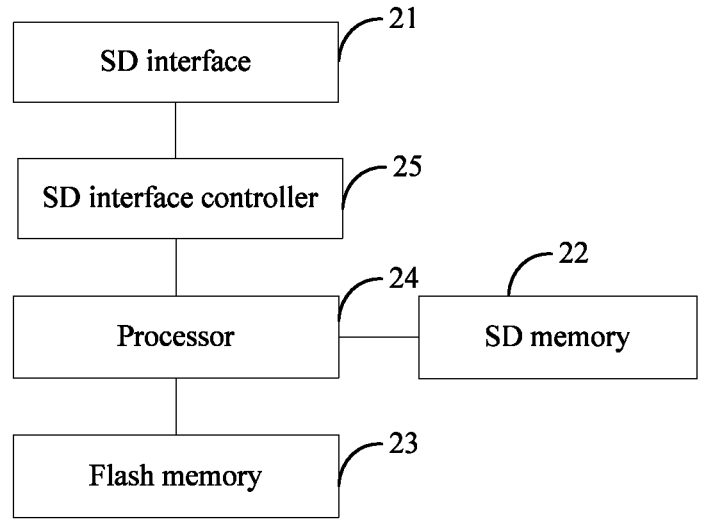
FIG. 13 is a schematic structural diagram of a communication device having an SD interface according to this application.
Figure 15:
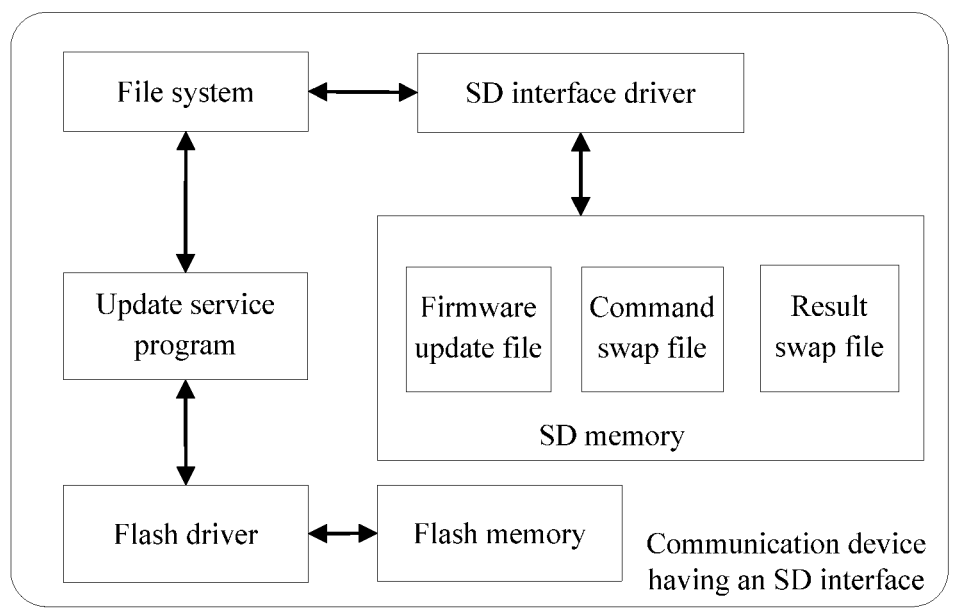
FIG. 15 is a schematic diagram of software integrated in a communication device having an SD interface according to this application.

For the schematic diagram of software integrated in the communication device having the SD interface shown in FIG. 13, reference may be made to FIG. 15, where the software integrated in the communication device having the SD interface includes an update service program, a file system, an SD interface driver, and a Flash driver. The SD interface driver is integrated in the SD interface controller 25, and the update service program, file system, and Flash driver are integrated in the processor 24.

Through the file system, the update service program reads the firmware update file, and accesses and updates the command swap file and result swap file. The file system obtains file information from the SD memory 22 through the SD interface driver, and accesses data in the SD memory 22 through the SD interface driver. The update service program writes the firmware update file to the Flash memory 23 through the Flash driver and completes the firmware update.

Figure 16:
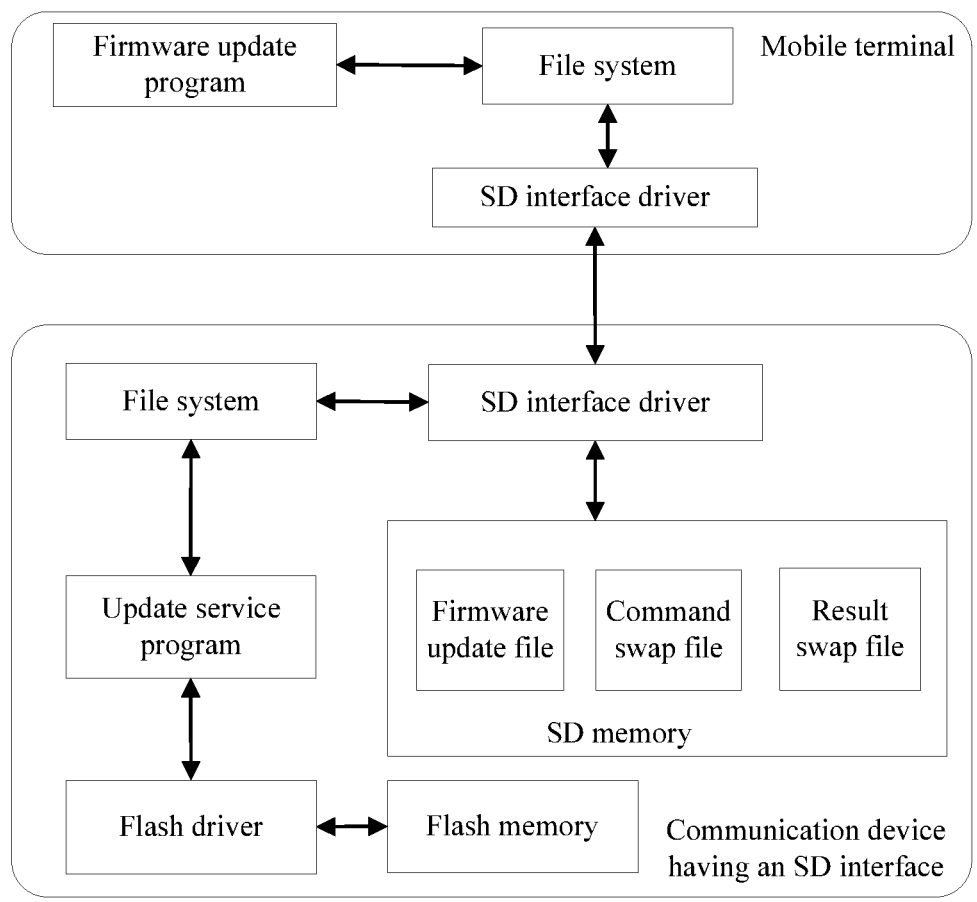
FIG. 16 is a schematic diagram of an information interaction between a communication device having an SD interface and integrated software in a mobile terminal according to this application.

For the process of information interactions between software in the communication device having the SD interface and software in the mobile terminal, reference may be made to FIG. 16. The software in the mobile terminal includes a firmware update program and an SD interface driver, where the firmware update program includes a firmware update file, which is written through the SD interface driver to the SD memory 22 in the communication device having the SD interface, where the SD interface driver is supported by the operating system in the mobile terminal.

The specific process of information interactions between the software in the communication device having the SD interface and the software in the mobile terminal in the update process of the communication device having the SD interface is as follows.

The firmware update program in the mobile terminal creates a command swap file and a result swap file in the SD memory 22 by using an SCSI command, downloads a firmware update file, and writes the firmware update file, through the SD interface driver in the mobile terminal and the SD interface driver in the communication device having the SD interface, to the SD memory 22 in the communication device having the SD interface.

After the firmware update file is written to the SD memory 22 completely, the firmware update process is started. The firmware update program writes the update start command to the command swap file by using an SCSI command. After the update service program in the communication device having the SD interface finds the update start command in the command swap file, the communication device having the SD interface is restarted, and the communication device having the SD interface enters the update mode.

In the update mode, the update service program checks validity of the firmware update file stored in the SD memory 22, and after detecting that the firmware update file is valid, starts to read the firmware update file through the file system and the SD interface driver, and writes the firmware update file to the Flash memory 23 through the Flash driver.

After starting the firmware update, the firmware update program in the mobile terminal periodically writes an update status query command to the command swap file by using an SCSI command. The update service program in the communication device having the SD interface writes the update progress and update result to the result swap file by using an SCSI command. In this case, the firmware update program in the mobile terminal can obtain the update progress and update result, and the firmware update program implements user interface (UI) displaying.

It should be noted that the embodiments in the specification are all described in a progressive manner, where each embodiment focuses on differences from other embodiments, and mutual reference may be made to the same or similar part of the embodiments. For the apparatus embodiment, because it is basically similar to the method embodiment, the apparatus embodiment is described briefly, and for the relevant part, reference may be made to the part of the description of the method embodiment.

Finally, it should also be noted that in this document, relational terms such as first and second are used only to distinguish one entity or operation from another entity or operation without necessarily requiring or implying any actual such relationship or order between such entities or operations. Furthermore, the terms "comprising", "including", or any other variant thereof, are intended to cover a non-exclusive inclusion, so that a process, a method, an article, or a device that includes a list of elements not only includes those elements but also includes other elements which are not expressly listed or are inherent to the process, method, article, or device. An element proceeded by "includes a . . . " does not, without more constraints, exclude the existence of additional same elements in the process, method, article, or device that includes the element.

For ease of description, when the foregoing apparatus is described, the apparatus is functionally divided into different units, which are described respectively. Of course, functions of each unit may be implemented in a same piece or multiple pieces of software and/or hardware when this application is implemented.

Based on the description of the preceding embodiments, a person skilled in the art may understand that this application may be implemented by software and a necessary universal hardware platform. Based on such an understanding, the technical solutions of this application or contributions to the prior art may be embodied in the form of a software product. The software product may be stored in a storage medium such as a read-only memory (ROM)/random-access memory (RAM), a magnetic disk, or an optical disc, and includes several instructions for instructing a computer device (which may be a personal computer, a server, or a network device or the like) to perform the methods in all the embodiments of this application or in some parts of the embodiments.

Detailed above are the method, apparatus, and communication device for updating firmware according to this application. The principle and implementation manner of this application are described herein with reference to specific embodiments. The foregoing descriptions of the embodiments are merely used for better understanding of the method and core idea of this application. A person of ordinary skill in the art can make variations and modifications to the specific implementation manner and application scope according to the idea of this application. Therefore, content of the specification shall not be construed as a limitation to this application.

What is claimed is:

1. A method for updating firmware, applied to a communication device having a secure data (SD) interface through which the communication device having the SD interface performs data communication with a mobile terminal, wherein the communication device having the SD interface comprises a secure data memory and a Flash memory, wherein the secure data memory stores a command swap file, wherein the secure data memory is a memory accessed by the mobile terminal through the SD interface, wherein the Flash memory is a memory storing the firmware in the communication device having the SD interface, and wherein the method comprises:

obtaining an update start command from the command swap file when the mobile terminal determines that a version number of the firmware in the communication device having the SD interface is inconsistent with a version number of the firmware stored on a server, wherein the update start command is written by the mobile terminal to the command swap file;

reading, from the secure data memory, a firmware update file storing update data after the update start command is obtained, wherein the firmware update file comprises a binary file that includes a file information header, firmware data, and check information, wherein the firmware update file is downloaded by the mobile terminal and written by the mobile terminal to the secure data memory, and wherein the update data comprises program codes for updating the firmware of the communication device having the SD interface; and writing the firmware update file to the Flash memory.

2. The method for updating firmware according to claim 1, wherein the secure data memory further stores a result swap file, and wherein the method further comprises:

writing update progress to the result swap file in the process of writing the firmware to the Flash memory; and writing the update result to the result swap file after the firmware update file is written to the Flash memory.

3. The method for updating firmware according to claim 2, wherein the update progress and update result are written to the result swap file by using a small computer system interface command.

4. The method for updating firmware according to claim 2, further comprising:

obtaining an update status query command from the command swap file; and sending the result swap file to the mobile terminal after the update status query command is obtained, wherein the update progress and update result are written in the result swap file.

5. The method for updating firmware according to claim 1, further comprising deleting the update start command from the command update file after the firmware update file is written to the Flash memory completely.

6. The method for updating firmware according claim 5, further comprising:

after the update start command is obtained, restarting the communication device having the SD interface, entering an update mode of the communication device having the SD interface, and in the update mode, reading, from the secure data memory, the firmware update file storing the update data; and after the firmware update file is written to the Flash memory completely, restarting the communication device having the SD interface, and entering a common running mode of the communication device having the SD interface.

7. The method for updating firmware according to claim 5, wherein before reading, from the secure data memory, the firmware update file storing the update data, the method further comprises:

checking the firmware update file; and reading, from the secure data memory, the firmware update file storing the update data after it is checked that the firmware update file is a valid file.

8. The method for updating firmware according to claim 1, further comprising providing a progress update by reporting a percentage of a size of the firmware update file that has been written to a total size of the firmware update file.

9. The method for updating firmware according to claim 1, further comprising providing an update result by indicating an update success or an update failure.

10. A method for updating firmware, applied to a mobile terminal which performs data communication through a secure digital interface with a communication device having a secure data LSD) interface, wherein the communication device having the SD interface comprises a secure data memory and a Flash memory, wherein the secure data memory stores a command swap file, wherein the secure data memory is a memory accessed by the mobile terminal through the SD interface, wherein the Flash memory is a memory storing the firmware in the communication device having the SD interface, and wherein the method comprises:
    downloading a firmware update file storing update data, wherein the firmware update file comprises a binary file that includes a file information header, firmware data, and check information;
    writing the firmware update file to the secure data memory; and
    writing an update start command in the mobile terminal to the command swap file such that the communication device having the SD interface obtains the update start command to perform firmware update after the firmware update file is written to the secure data memory completely,
    wherein the update start command is obtained when the mobile terminal determines that a version number of the firmware in the communication device having the SD interface is inconsistent with a version number of the firmware stored on a server.

11. The method for updating firmware according to claim 10, further comprising writing an update status query command in the mobile terminal to the command swap file.

12. The method for updating firmware according to claim 11, wherein the secure data memory further stores a result swap file, and wherein the method further comprises:
    receiving the result swap file sent by the communication device having the SD interface, wherein the result swap file is sent after the communication device having the SD interface obtains the update status query command, and wherein the update progress and update result are written in the result swap file; and
    displaying the update progress and update result on the mobile terminal.

13. The method for updating firmware according to claim 11, wherein the update start command and update status query command are written to the command swap file by using a small computer system interface command.

14. An apparatus for updating firmware, applied to a communication device having a secure data (SD) interface through which the communication device having the SD interface performs data communication with a mobile terminal, wherein the communication device having the SD interface comprises a secure data memory and a Flash memory, wherein the secure data memory stores a command swap file, wherein the secure data memory is a memory accessed by the mobile terminal through the SD interface, wherein the Flash memory is a memory storing the firmware in the communication device having the SD interface, and wherein the apparatus comprises:
    a memory; and
    a computer processor coupled to the memory and configured to:
        obtain an update start command from the command swap file when the mobile terminal determines that a version number of the firmware in the communication device having the SD interface is inconsistent with a version number of the firmware stored on a server, wherein the update start command is written by the mobile terminal to the command swap file;
        read, from the secure data memory, a firmware update file storing update data after the update start command is obtained, wherein the firmware update file comprises a binary file that includes a file information header, firmware data, and check information, wherein the firmware update file is downloaded by the mobile terminal and written by the mobile terminal to the secure data memory, and wherein the update data comprises program codes for updating the firmware of the communication device having the SD interface; and
        write the firmware update file to the Flash memory.

15. The apparatus for updating firmware according to claim 14, wherein the secure data memory further stores a result swap file, and wherein the computer processor is configured to:
    write update progress to the result swap file in the process of writing the firmware update file to the Flash memory; and
    write the update result to the result swap file after the firmware update file is written to the Flash memory.

16. The apparatus for updating firmware according to claim 15, wherein the computer processor is configured to:
    write the update progress to the result swap file by using a small computer system interface command; and
    write the update result to the result swap file by using a small computer system interface command.

17. The apparatus for updating firmware according to claim 15, wherein the processor is configured to:
    obtain an update status query command from the command swap file; and
    send the result swap file to the mobile terminal after the update status query command is obtained, wherein the update progress and update result are written in the result swap file.

18. The apparatus for updating firmware according to claim 14, wherein the computer processor is configured to delete the update start command from the command update file after the firmware update file is written to the Flash memory completely.

19. The apparatus for updating firmware according to claim 18, wherein
    the computer processor is configured to:
    after the update start command is obtained, restart the communication device having the SD interface, and enter an update mode of the communication device having the SD interface; and
    after the firmware update file is written to the Flash memory completely, restart the communication device having the SD interface, and enter a common running mode of the communication device having the SD interface,
    wherein the computer processor is configured to read, in the update mode from the secure data memory, the firmware update file storing the update data.

20. The apparatus for updating firmware according to claim 18, wherein the computer processor is configured to:
    check the firmware update file; and
    read, from the secure data memory, the firmware update file storing the update data after it is checked that the firmware update file is a valid file.

\* \* \* \* \*